Jan. 2, 1945. H. F. MacMILLIN 2,366,417
CONTINUOUS EXTRUSION MOLDING OF PLASTICS
Filed March 30, 1942 4 Sheets-Sheet 1

INVENTOR
HOWARD F. McMILLIN
BY Toulmin & Toulmin
ATTORNEYS

Patented Jan. 2, 1945

2,366,417

UNITED STATES PATENT OFFICE 2,366,417

CONTINUOUS EXTRUSION MOLDING OF PLASTICS

Howard F. MacMillin, Mount Gilead, Ohio, assignor to The Hydraulic Development Corp. Inc., Wilmington, Del., a corporation of Delaware Application March 30, 1942, Serial No. 436,901

14 Claims. (Cl. 18—12)

This invention relates to an apparatus for continuous extrusion of plastic material, and more particularly relates to an apparatus and method for continuously extruding a heated plastic material which is fed into an extrusion cylinder in granular form, and is heated therein to plasticity for extrusion therefrom in a plastic condition and by means of a reciprocating or intermittently operating extrusion apparatus.

In this invention the granular thermoplastic or thermosetting resin is fed to an extrusion cylinder for heating therein to bring the plastic material to a plastic condition. An extrusion plunger is adapted to reciprocate within the extrusion cylinder for forcing the heated and plasticized material from the extrusion cylinder. The extrusion plunger reciprocates within the cylinder so that fresh charges of material can be fed into the cylinder and be ejected therefrom by the extrusion plunger. The plasticized material is thus forced from the extrusion cylinder intermittently.

To provide for a continuous flow of plasticized material from an extrusion nozzle or die two or more extrusion cylinders are arranged to cooperate with one another so that the intermittent ejections of material from the extrusion cylinders will produce a continuous flow of plasticized material from the extrusion nozzle or die. The apparatus is adapted to be fully automatic in its operation so that movements of the extrusion plungers will overlap in a manner to produce a continuous flow of plasticized material through the extrusion nozzle or die.

An object of the invention is to provide a method and apparatus for continuously extruding plasticized material by means of intermittently operating extrusion apparatus.

Another object of the invention is to provide a method and apparatus for continuously extruding plasticized material by means of intermittently operating extrusion devices wherein the ejection strokes overlap in a manner to produce a continuous flow of plasticized material.

Another object of the invention is to provide an extrusion apparatus having a plurality of intermittently operating extrusion devices operating in synchronism to produce a continuous flow of plasticized material.

Another object of the invention is to provide an extrusion apparatus wherein a plurality of intermittently operated extrusion devices feed a single extrusion nozzle or die in a manner that the flow of plasticized material through the die is continuous.

Another object of the invention is to provide an extrusion apparatus having a plurality of intermittently operating extrusion devices actuated by a hydraulic system which is completely automatic in its operation to produce a continuous flow of plasticized material through an extrusion nozzle.

It is another object of the invention to provide an extrusion apparatus having a plurality of intermittently operating extrusion devices which is actuated by means of a hydraulic system in a manner that the extrusion devices are actuated by alternate application of high and low fluid pressure for ejecting plasticized material from the extrusion cylinder and for feeding granular plastic material to the cylinder.

It is another object of the invention to provide a hydraulic system for a plurality of intermittently operating extrusion devices for producing a continuous flow of plasticized material through a common extrusion nozzle.

Another object of the invention is to provide an electric control system for an extrusion apparatus having a plurality of intermittently operating extrusion devices for synchronizing the devices in a manner that a continuous flow of plasticized material is forced through a common extrusion nozzle.

Further objects and advantages will become apparent from the drawings and from the following description.

In this invention the extrusion machine consists of a plurality of plastic injection or extrusion units having reciprocating ejection or extrusion plungers which intermittently move plasticized material through the injection cylinders of the respective units. The injection units are constructed and arranged so that each unit will perform the alternate operations of ejecting plastic material from the injection cylinder and feeding granular plastic material into the injection cylinder to be plasticized therein upon heating within the injection cylinder. To produce a continuous flow of plastic material which can be extruded through an extrusion nozzle or die into the form of a continuous plastic strip, two or more injection units are arranged to supply a single extrusion nozzle with plastic material, and are operated in a manner that the ejection cycle of operation is overlapped in a manner that the flow of plasticized material to the extrusion nozzle is continuous.

A hydraulic actuating system is provided for the extrusion or ejection units which is constructed and arranged in a manner that low pressure hydraulic fluid is supplied to each of the ejection units to retract the ejection or extrusion plunger after an ejection or extrusion stroke to permit granular plastic material to feed into the ejection or extrusion cylinder. The low pressure hydraulic fluid then advances the extrusion plunger to compact the charge of granular plastic material into the extrusion cylinder. When the extrusion plunger has traversed a certain portion of the extrusion cylinder high pressure hydraulic fluid is then applied upon the extrusion plunger to force the plasticized material in front of the same out of the extrusion cylinder. The extrusion plungers of the plurality of extrusion units are operated in synchronism to produce a continuous flow of plastic material to an extrusion nozzle.

The machine

Figure 1:
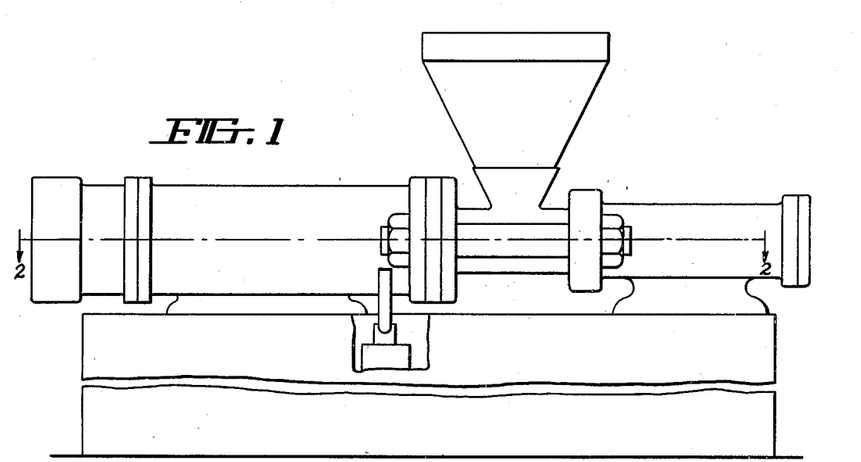
Figure 1 is a side elevational view of an extrusion apparatus constructed in accordance with the teachings of this invention.
Figure 2:
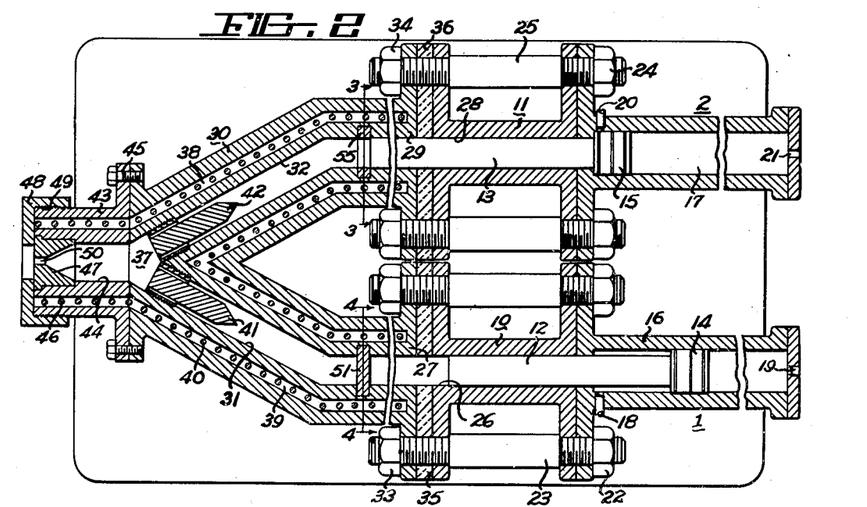
Figure 2 is a longitudinal cross-sectional view of the extrusion apparatus of Figure 1 and is taken along line 2—2 of Figure 1.

An apparatus to obtain the results of this invention is shown in Figures 1 and 2 in somewhat of an elementary form. The apparatus shown herein consists of a pair of extrusion cylinders 10 and 11 within which extrusion plungers 12 and 13 reciprocate. The extrusion plungers 12 and 13 have pistons 14 and 15 secured thereto which reciprocate within cylinders 16 and 17 respectively. The pistons 14, 15 and the cylinders 16, 17 provide hydraulic motors for reciprocating the extrusion plungers 12 and 13. These motors will be identified with the numeral 1 for the extrusion plunger 12 and with the numeral 2 for the extrusion plunger 13. Fluid inlet and outlet passages 18 and 19 are provided for the hydraulic motor 1, while fluid inlet and outlet passages 20 and 21 are provided for the hydraulic motor 2. The hydraulic motor 1 is secured to the extrusion cylinder 10 by suitable means, such as the nuts 22, secured upon the ends of the rods 23. The motor 2 is secured to the cylinder 11 by similar means including the nuts 24 and the threaded rods 25.

The extrusion cylinder 10 consists of a feeding chamber 26 and a heating chamber 27, the extrusion cylinder 11 having a similar feeding chamber 28 and a heating chamber 29. A hopper 131 is positioned above the feeding chamber 26 of the extrusion cylinder 10 for supplying granular plastic material to the chamber 26. The plastic material can move into the chamber 26 by a gravity flow or a suitable mechanical feed can be provided for supplying predetermined quantities of material into the feeding chamber 26 in any manner well-known in the art. A similar feed hopper not shown is supplied for the feeding chamber 28 of the extrusion cylinder 11.

The heating chambers 27 and 29 are provided within a substantially V-shaped body 30 having a passage 31 associated with the heating chamber 27 and the passage 32 associated with the heating chamber 29. The body 30 is secured to the injection cylinders 10 and 11 by means of the nuts 33 threaded upon the rods 23 and the nuts 34 threaded upon the rods 25. Suitable heat insulating material 35 is disposed between the heating chamber 26 of the extrusion cylinder 10, and similar heat insulating material 36 is disposed between the heating chamber 29 and the feeding chamber 28 of the extrusion cylinder 11.

The passages 31 and 32 in the body 30 merge into a common discharge opening 37 through which plasticized material from either extrusion cylinder 10 or 11 can flow. A heating chamber 38 is provided around the passage 32 and the heating chamber 29 of the extrusion cylinder 11 and a similar heating chamber 39 is provided around the passage 31 and the heating chamber 27 of the extrusion cylinder 10. As shown in the drawings, an electric resistance unit 40 can be used for supplying heat within the heating chambers 38, 39 to transfer heat to the passages 31, 32 and the heating chambers 27 and 29, or other suitable heating means can be provided, such as hot liquids, steam, radiant heat or any other suitable form of heat. Torpedos 41 and 42 are provided in the passages 31 and 32 respectively to cause the plastic material flowing through the passages to intimately engage the heating surface around the respective passages to insure that the material will be completely plasticized before entering the discharge opening 37.

A nozzle 43 having an internal bore 44 is secured to the apex of the V-shaped body 30 by means of bolts 45. The bore 44 communicates with the discharge opening 37 to receive plasticized material from either passage 31 or 32. The nozzle 43 may have a heating means therein, such as the electric resistance unit 46 for maintaining the plastic material in plasticized condition within the nozzle passage 44. A suitable extrusion die 47 is disposed within the passage or bore 44 and is retained therein by means of the retaining nut 48 secured upon the threaded end 49 of the nozzle 43. The extrusion die 47 has an extrusion opening 50 through which the plastic material is continuously extruded by the synchronous operation of the extrusion plungers 12 and 13 in a manner to be hereinafter described. The extrusion opening 50 may have any suitable shape to produce decorative strips of plastic material, tubes, or any other desired article of manufacture which can be made in continuous strips.

Figure 3:
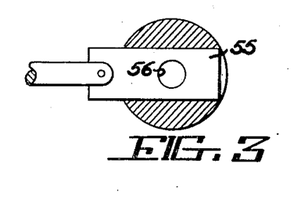
Figure 3 is a transverse cross-sectional view taken along line 3—3 of Figure 2 showing the gate for closing the extrusion cylinder.
Figure 4:
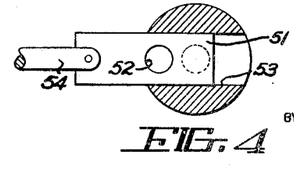
Figure 4 is a transverse cross-sectional view taken along line 4—4 of Figure 2 showing the gate for the extrusion cylinder in position to prevent discharge of material from the cylinder.

The heating chamber 27 of the extrusion cylinder 10 is provided with a gate 51 having an opening 52 therein adapted to coincide with the heating chamber 27. The heating chamber 27 has a slot 53 to receive the gate 51. A link is secured to the gate 51 for connecting the same to a suitable operating mechanism to be hereinafter described. The heating chamber 29 of the extrusion cylinder 11 is provided with a similar gate 55 having an opening 56 therein.

The hydraulic system

Figure 9:
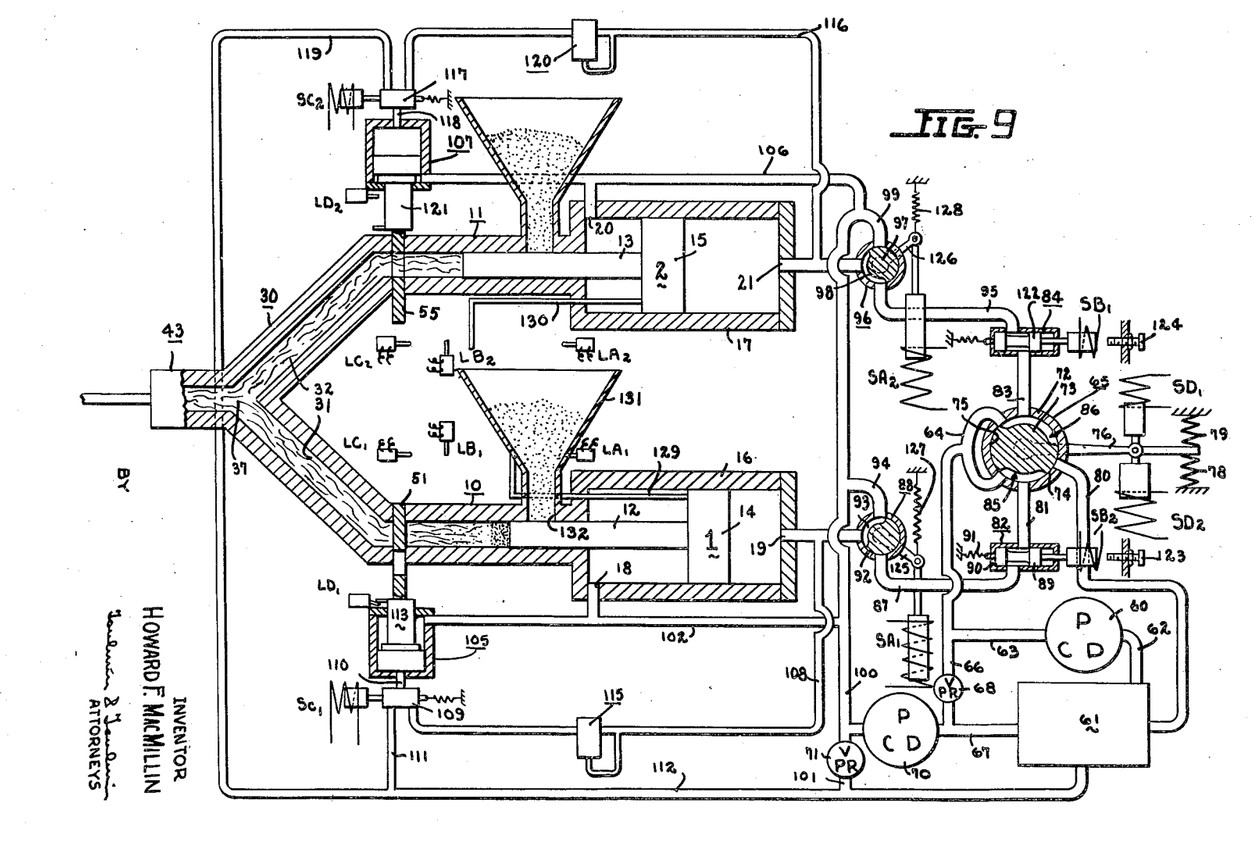
Figure 9 is a diagrammatic view of the extrusion apparatus of this invention showing a schematic hydraulic system applied to the apparatus, and indicating the location of the various electric controls for providing automatic operation of the apparatus.

The hydraulic system consists of a constant delivery high pressure pump 60 having a mechanism which can adjust or change the delivery of the pump, but which delivery once set will be maintained at a constant volume. Such constant delivery pumps are well known in the art and it is not believed further disclosure is necessary. The hydraulic system has a second fluid pump 70 which may be either a constant delivery pump used in combination with a by-pass control 71, or a variable delivery pump which will shift to neutral when the pressure on the delivery side of the pump is above a predetermined maximum. The pump 70 is adapted to deliver a large volume of fluid at low pressure. A reservoir 61 supplies fluid for the pumps 60 and 70.

The high pressure constant delivery pump 60 has a suction line 62 connecting the same to the reservoir 61. A discharge conduit 63 for the pump 60 delivers fluid to a Y connection 64 of a flow control valve 65. A by-pass conduit 66 connects the discharge conduit 63 with a return conduit 67 to the reservoir 61. The return conduit 67 is also the suction line for the low pressure pump 70. A pressure relief valve 68 is disposed in the conduit 66 for relieving pressure in the discharge conduit 63 if the pressure therein should rise extremely high, and thereby acts solely as a safety valve.

The flow control valve 65 has a cylindrical body 72 within which there is provided a rotor 73 having land areas 74 and 75. The rotor 73 is rotated by means of an arm 76. The arm 76 is maintained in position as shown in Figure 9 by means of springs 78 and 79 arranged in opposed relationship for balancing each other and thereby locating the arm 76 whenever the arm is released by electrical mechanism to be hereinafter described.

The flow control valve 65 has a conduit 80 which connects the interior of the valve to the reservoir 61. A conduit 81 connects the valve with a flow restriction valve 82 and a conduit 83 connects the valve 65 with a flow restriction valve 84. A flow passage 85 is provided on one side of the rotor 74 and a flow passage 86 is provided on the opposite side of the rotor 73. These passages 85 and 86 interconnect the various conduits of the flow control valve 65 for directing high pressure fluid in a manner which will be hereinafter described.

The restriction valve 82 has a discharge conduit 87 which is connected to a flow control valve 88 for controlling the flow of high pressure fluid from the conduit 87 into the hydraulic motor 1 through the inlet conduit 19.

The restriction valve 82 has a spool 89 therein having a head 90 adapted to partially close the conduit 87 under certain conditions of operation of the system to be hereinafter described. The spool 89 is normally retained in the position shown in Figure 9 by means of the spring 91.

The flow valve 88 has a rotor 92 with a passage 93 adapted to interconnect the conduit 87 with the conduit 19 or a conduit 94 with the conduit 19.

The restriction valve 84 has a discharge conduit 95 for connecting the same to a flow control valve 96 which has a rotor 97 having a passage 98 therein for interconnecting the conduit 95 with the conduit 21 of the hydraulic motor 2 of the conduit 21 with a conduit 99.

The low pressure pump 70 receives fluid from the reservoir 61 through the conduit 67 and discharges the fluid under low pressure into the conduit 100. If the low pressure pump 70 is of a constant delivery type then a pressure relief valve 71 is provided in a by-pass line 101 to return excess delivery of fluid to the reservoir 61. However, if the low pressure delivery pump is of a variable delivery type of pump then the by-pass valve 71 may be eliminated.

The low pressure fluid in the conduit 100 is delivered to the conduits 94 and 99 feeding the flow valves 88 and 96 in a manner to be hereinafter described. The low pressure conduit 100 communicates with a conduit 102 for delivering low pressure fluid to the push back side of the hydraulic motor 1 through the inlet-outlet conduit 18 and to the push back side of a hydraulic motor 105 which is connected to the gate 51 of the extrusion cylinder 10. The low pressure conduit 100 is also connected to a conduit 106 which delivers low pressure fluid to the push back side of the hydraulic motor 2 through the inlet-outlet conduit 20 and to the push back side of a hydraulic motor 107 which is connected to the gate 55 of the extrusion cylinder 11.

The inlet-outlet conduit 19 of the hydraulic motor 1 is connected to a conduit 108 for delivering fluid to the hydraulic motor 105 through a flow control valve 109 which is normally maintained in a position to interconnect the conduit 108 and a conduit 110 of the hydraulic motor 105. The flow control valve 109 has a conduit 111 for connecting the flow control valve 109 to a return conduit 112 which connects with the reservoir 61. A pressure actuated valve 115 is disposed in the conduit 108 to prevent flow of fluid through the conduit 108 to the hydraulic motor 105 until the pressure in the conduit 108 is at the pressure delivered by the high pressure constant delivery pump 60. Therefore, low pressure in the conduit 108 will not cause operation of the hydraulic motor 105 to advance a plunger 113 of the motor 105.

The inlet-outlet conduit 21 of the hydraulic motor 2 is connected to a conduit 116 for delivering fluid to the hydraulic motor 107 through a flow control valve 117. The flow control valve 117 is maintained in a position to interconnect the conduit 116 with a conduit 118 for the hydraulic motor 107. The flow control valve 117 also has a conduit 119 which connects with the return conduit 112. A pressure actuated valve 120 is disposed in the conduit 116 to prevent flow of fluid through the conduit 116 to the motor 107 until the pressure in the conduit 116 is substantially equal to the pressure being delivered by the high pressure constant delivery pump 60. Therefore, the plunger 121 of the hydraulic motor 107 will not be actuated when low pressure is standing in the conduit 116.

The electric controls

In designating the electric controls which cooperate with one or the other of the hydraulic motors 1 and 2, those controls which bear a subscript 1 are associated with the extrusion unit having the hydraulic motor 1, while those controls having the subscript 2 are associated with the extrusion unit having the hydraulic motor 2. The electric relays will be indicated with the letters A, B, C and D and a corresponding subscript, depending upon its association with hydraulic motor 1 or 2.

Figure 10:
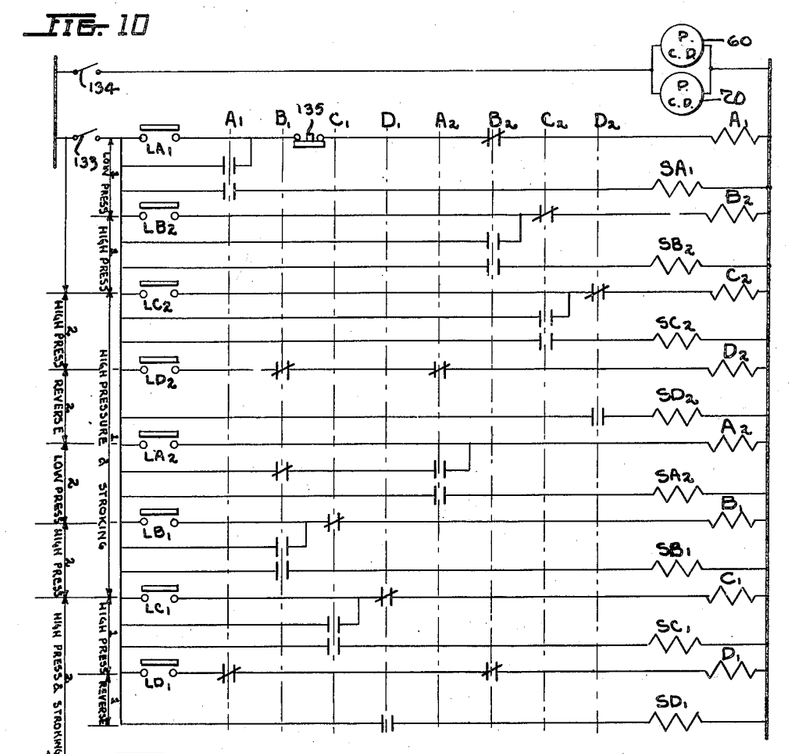
Figure 10 is a schematic electric wiring diagram of the electric controls.

The contacts which are operated by the respective relays will also be designated with the letters A, B, C and D with a corresponding subscript depending upon their association with the particular relay aassociated with hydraulic motor 1 or 2. As shown in Figure 10 all contacts for relay A—1 are disposed in vertical alignment in the dot-dash line indicated A—1. The same situation holds true for the other relays B, C and D. The solenoid valves will be indicated SA, SB, SC and SD, according to the association thereof with the relay A, B, C or D which actuates the same and with a subscript depending upon the association of the solenoid with the hydraulic motors 1 and 2.

The limit switches will be indicated by the letters LA, LB, LC and LD, according to the association of the limit switch with the relay which it energizes and with a subscript depending upon its association with the hydraulic motors 1 and 2.

The electrical apparatus consists of solenoids SD—1 and SD—2 having the armatures thereof connected to the actuating arm 76 of the flow control valve 65 in opposed relationship to move the arm in opposite directions according to the energization of the respective solenoids. The armature of solenoid SD—2 is larger than the armature of solenoid SD—1 so that when both solenoids are energized simultaneously, in a manner hereinafter to be described, solenoid SD—2 will dominate solenoid SD—1 and actuate the arm 76 of the flow control valve 65. Solenoids SB—1 and SB—2 are provided for the restriction valves 82 and 84 for actuating the spools 89 and 122 of the respective valve to restrict the conduits 87 and 95 in a manner to be hereinafter described. The movement of the armatures of the solenoids SB—1 and SB—2 is regulated by means of adjusting screws 123 and 124 respectively.

Solenoids SA—1 and SA—2 have the armatures thereof connected to the arms 125 and 126 of the flow control valves 88 and 96 respectively for rotating the rotors 92 and 97 respectively. Springs 127 and 128 normally tend to lift the armatures from the solenoids SA—1 and SA—2 in the manner of the position of flow control valve 96 (see Figure 9).

Solenoids SC—1 and SC—2 actuate the flow control valves 109 and 117 to connect the hydraulic motors 105 and 107 respectively with the return line 112 when the solenoids are energized.

Limit switches LA—1 and LA—2 are engaged by arms 129 and 130 of the hydraulic motors 1 and 2 respectively when the pistons of the respective hydraulic motors have been completely retracted within their cylinders 16 and 17. Limit switches LB—1 and LB—2 are engaged by the arms 129 and 130 respectively when the hydraulic motors 1 and 2 have positioned the plungers 12 and 13 thereof near the end of the forward stroke of the respective plungers. Limit switches LC—1 and LC—2 are engaged by the arms 129 and 130 respectively when the plungers of the respective hydraulic motors 1 and 2 have completed their forward ejection or extrusion stroke.

Limit switches LD—1 and LD—2 are closed by means of the plungers 113 and 121 of the hydraulic motors 105 and 107 respectively when the gates 51 and 55 respectively have been closed by means of the respective hydraulic motors 105 and 107.

General scheme of operation

The general scheme of operation of movement of the plastic material through the extrusion cylinders 10 and 11 for maintaining a continuous flow of plasticized material through the extrusion nozzle 43 is shown in Figures 5 to 8 inclusive. Beginning with Figure 5, the gate 55 has been opened and high pressure has been applied to the hydraulic motor 2 by means of the pump 60 to advance the extrusion plunger 13. This extrusion plunger 13 is therefore advancing in the extrusion cylinder 11 and forcing plasticized material which has been heated in the extrusion cylinder 11 through the passage 32 and out of the nozzle 43. Low pressure is being applied to the retraction side of the hydraulic motor 1 through the inlet-outlet passage 18 for retracting the extrusion plunger 12 from within the extrusion cylinder 10 to permit granular plastic material to flow from the hopper 131 through the opening 132 into the extrusion cylinder 10.

Figure 6:
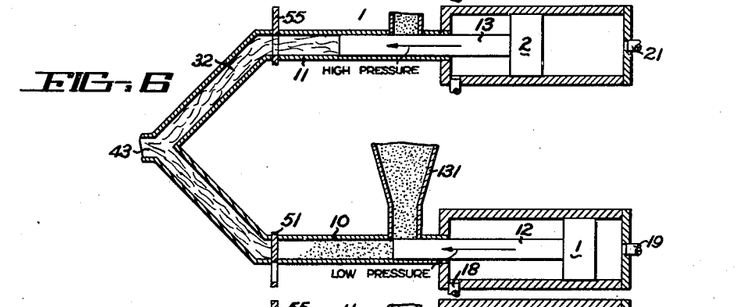
Figure 6 is a diagrammatic view of the extrusion apparatus, similar to Figure 5, showing one of the extrusion devices continuing its forward extrusion stroke while the other extrusion device is compacting the charge of granular material fed thereinto.

When the hydraulic motor 1 completely retracts the plunger 12 the inlet-outlet conduit 19 will receive low pressure hydraulic fluid to advance the plunger 12 into the extrusion cylinder 10 (as shown in Figure 6). The plunger 12 will advance because of the area differential on the two sides of the piston which actuates the plunger 12. The plunger 13 continues forward advancement into the extrusion cylinder 11 under high pressure fluid admitted through the inlet-outlet conduit 21.

Both plungers 12 and 13 will thus move forward, plunger 13 continuing extrusion of plasticized material through the nozzle 43, while plunger 12 compacts the charge of granular plastic material which has been admitted into the extrusion cylinder 10. The gate 51 of the extrusion cylinder 10 is of course closed at this time.

As the plungers 12 and 13 advance into the extrusion cylinders 10 and 11 the plunger 13 approaches the end of its stroke at which time the gate 51 of the extrusion cylinder 10 will be opened and high pressure will be applied to the hydraulic motor 1 through the inlet-outlet passage 19. The flow of hydraulic fluid to the hydraulic motor 1 under these conditions is restricted by means of the restriction valve 82 to prevent the plunger 12 from getting ahead of plunger 13 in case plunger 13 should meet exceptionally high restriction and thus throw the machine out of synchronism. We thus have, in Figure 7, high pressure applied to both hydraulic motors 1 and 2 advancing the plungers 12 and 13 respectively, but with the volume flow to the hydraulic motor 1 restricted so that the hydraulic motor 1 will move slower than the hydraulic motor 2.

Figure 8:
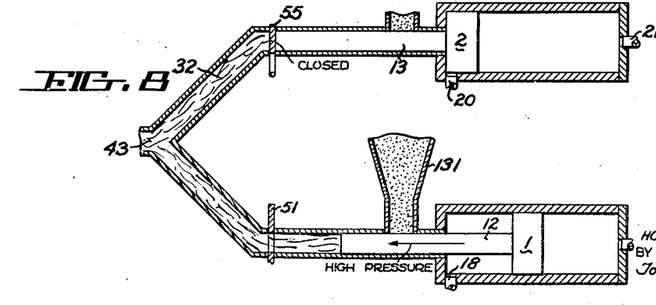
Figure 8 is a diagrammatic view of the extrusion apparatus, similar to Figure 7, showing one of the extrusion devices at the completion of its extrusion stroke and the other of the extrusion devices continuing its extrusion stroke.

This condition prevails until the extrusion plunger 13 reaches the end of its extrusion stroke (as shown in Figure 8). At this time the gate 55 is closed wiping the end of the plunger 13 clean.

Also, at this time the restriction to the flow of fluid to the hydraulic motor 1 is eliminated and therefore full and unrestricted flow of fluid under high pressure is transferred to the hydraulic motor 1. High pressure will be retained on hydraulic motor 2 until the gate 55 is completely closed. At this time the inlet-outlet passage 21 of hydraulic motor 2 will be opened to the reservoir 61 and low pressure will be applied to the push back side of hydraulic motor 2 through the inlet-outlet passage 20 to retract the extrusion plunger 13. The cycle is then repeated with extrusion plunger 13 now following the cycle of operation previously described for extrusion plunger 12.

Figure 5:
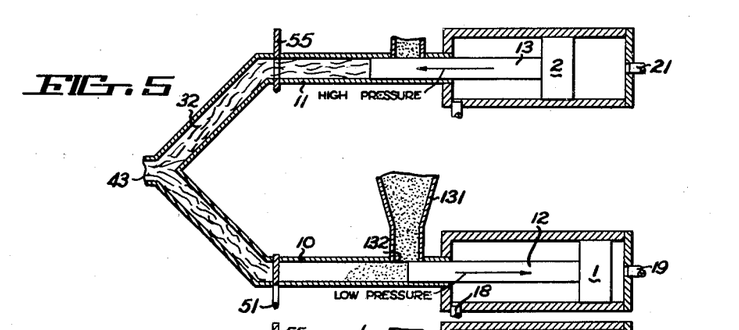
Figure 5 is a diagrammatic view of the extrusion apparatus showing one portion of the cycle of operation wherein one of the extrusion devices is forcing material therefrom, while the other extrusion device is receiving a charge of granular plastic material.
Figure 7:
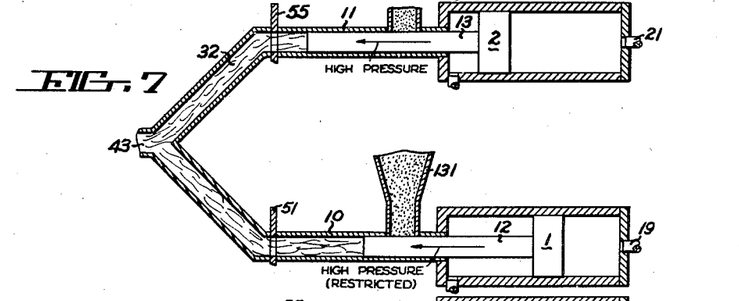
Figure 7 is a diagrammatic view of the extrusion apparatus, similar to Figure 6, showing one of the extrusion devices continuing its extrusion stroke and the other extrusion device being placed upon the extrusion stroke.

The apparatus herein described and the method of its operation will maintain a continuous flow of plasticized material through the extrusion nozzle 43 at all times regardless of whether a single plunger is moving forward to eject plasticized material (as shown in Figure 5) or whether both plungers are moving forward to eject plasticized material (as shown in Figure 7), since the rate of movement of the hydraulic motors 1 and 2 will be reduced when they are both receiving high pressure fluid from the constant delivery pump 60. The result is that the flow of plasticized material through the nozzle 43 remains constant. As soon as the flow of high pressure fluid is halted to the hydraulic motor 2 (as shown in Figure 8) the speed of operation of the hydraulic motor 1 will be increased to the extent of the full flow from the constant delivery pump 60.

*Detail operation of the system*

Figure 11:
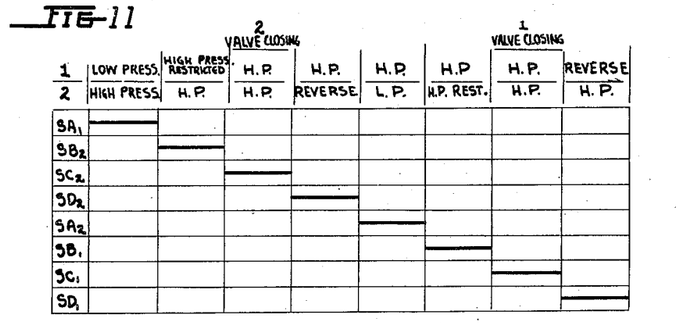
Figure 11 is a diagram chart representing the period of energization of the various solenoid valves of the system and their sequence of operation.

The operation of the extrusion machine can be followed in Figures 9, 10 and 11. Figure 11 represents the sequence of operation of the solenoids which actuate the various valves of the hydraulic system for the machine. Reading Figure 11 from left to right and from top to bottom it will be noted that only one solenoid is energized at any one time. The energization of the solenoids is indicated by the heavy black horizontal line. It will further be noted that when one solenoid is deenergized another solenoid is immediately energized so that there is a continuous sequence of operations being performed upon the machine.

Referring now to Figures 9 and 10, it must first be assumed that certain things have happened to place the machine in the cycle of operation as shown in Figure 9. Also, it must be remembered that the wiring diagram shown in Figure 10 is completely deenergized so that all control elements are at rest. Therefore, to place the machine in operation switches 133 and 134 have been closed so that the pumps 60 and 70 are delivering fluid into the hydraulic system and the control circuit for the machine is energized.

The position of the elements of the machine (as shown in Figure 9) is such that solenoid SA—1 is the only energized solenoid. All other electrical elements are deenergized. Pump 60 is delivering high pressure fluid into both passages 85 and 86 of the flow control valve 65 so that high pressure fluid stands in conduit 87 to control valve 88 and is being delivered through conduit 95, control valve 96 and conduit 21 to hydraulic motor 2. High pressure fluid now stands in conduit 116 and has opened valve 120 to advance the plunger 121 of hydraulic motor 107 to open the gate 55 in extrusion cylinder 11.

Low pressure fluid is being delivered by pump 70 and stands in conduit 100 for delivery through conduit 94, control valve 88 and conduit 19 to the hydraulic motor 1, whereby the hydraulic motor 1 is advancing to compact a fresh charge of granular plastic material. Low pressure fluid also stands in conduit 102 and has previously retracted the plunger 113 of the hydraulic motor 105 to close the gate 51 of extrusion cylinder 10. Low pressure fluid also stands in conduit 108 but cannot effect the hydraulic motor 105 since the pressure actuated valve 115 will not be opened by the low pressure. Low pressure fluid also stands in conduit 106 ready to cause actuation of hydraulic motors 2 and 107 when high pressure fluid has been released from these motors.

It will be noted at this point that hydraulic motor 2 is working in advance of hydraulic motor 1. Therefore, subsequent operation of the machine depends upon operation of the hydraulic motor 2. Considering the system in the condition just disclosed with hydraulic motor 2 extruding plasticized material from extrusion cylinder 11 and hydraulic motor 1 compacting a fresh charge of granular plastic material, the operation of the machine continues as follows.

The hydraulic motors 1 and 2 continue forward stroke from the position shown in Figure 9 until the actuating rod 130 of hydraulic motor 2 engages limit switch LB—2. When limit switch LB—2 energizes relay B—2 and actuates all of the contacts in column B—2, relay A—1 is deenergized to deenergize solenoid SA—1, whereby flow control valve 88 is shifted by spring 127 to interconnect conduits 87 and 19 for applying high pressure fluid to hydraulic motor 1. Simultaneously with this operation solenoid SB—2 is energized to actuate the restriction valve 82 and partially close conduit 87 whereby the flow of high pressure fluid to hydraulic motor 1 is restricted.

Restriction of the flow of high pressure fluid to hydraulic motor 1 prevents motor 1 from getting ahead of hydraulic motor 2, since hydraulic motor 2 is receiving an unrestricted flow of high pressure fluid at this time. Hydraulic motor 1 will therefore advance slower than hydraulic motor 2.

When high pressure fluid was applied to hydraulic motor 1 the pressure actuated valve 115 was operated to supply high pressure fluid to the hydraulic motor 105 to open the gate 51 in the extrusion cylinder 10, the high pressure fluid overcoming the low pressure fluid in conduit 102. Both hydraulic motors are now moving forward extruding plasticized material from both extrusion cylinders 10 and 11. However, they are moving forward at a reduced speed since the output of the pump 60 is now divided between the motors 1 and 2. Therefore, the flow of plastic material through the extrusion nozzle 43 will remain at the same constant flow as when the full delivery of the pump 60 was being applied to the motor 2.

The motors 1 and 2 will continue to advance with motor 2 ahead of motor 1 until the control rod 130 of motor 2 engages limit switch LC—2.

When limit switch LC—2 closes, relay C—2 is energized to actuate the contacts in column C—2 whereby solenoid SC—2 is energized and relay B—2 is deenergized to deenergize solenoid SB—2. Energization of solenoid SC—2 opens the conduit 118 of hydraulic motor 107 to the return line 119 through the flow control valve 117 whereby the low pressure fluid standing in conduit 106 retracts the plunger 121 of hydraulic motor 107 to close the gate 55 in the extrusion cylinder 11. High pressure fluid continues to stand upon the hydraulic motor 2 even though it has finished its extrusion stroke when the rod 130 engaged the limit switch LC—2. This is to prevent a halting in the flow of plastic material through the extrusion nozzle 43 due to any retraction of the plunger 13, and to insure that gate 55 will be closed before the high pressure fluid is released from the hydraulic motor 2.

Deenergization of the solenoid SB—2 by limit switch LC—2 permitted actuation of the restriction valve 82 for opening the conduit 87 to receive full flow of high pressure fluid and therefore move the hydraulic motor 1 at an increased rate of speed to maintain the flow of plastic material through the extrusion nozzle constant.

Hydraulic motor 1 therefore continues forward stroke at an increased rate of speed, while hydraulic motor 2 remains stationary until the plunger 121 closes the gate 55.

When limit switch LD—2 closes relay D—2 is energized to actuate the contacts in column D—2 whereby solenoid SD—2 is energized and relay C—2 is deenergized to deenergize solenoid SC—2. Deenergization of solenoid SC—2 permits valve 117 to return to a normal position to interconnect conduits 116 and 118 and thus precondition the hydraulic motor 107 to receive high pressure fluid at a subsequent portion of the cycle of operation of the machine.

Energization of solenoid SD—2 by limit switch LD—2 rotates the rotor 73 of the flow control valve 65 to close conduit 64a and interconnect the conduits 83 and 80 to permit exhaust of fluid from the hydraulic motor 2 to the reservoir 61. It will be remembered that low pressure fluid is standing in conduit 106 and therefore the hydraulic motor 2 will be immediately retracted upon establishing the exhaust line. Hydraulic motor 1 is continuing its forward advancement to extrude plasticized material through the extrusion nozzle but has not yet reached limit switch LB—1. Hydraulic motor 2 will retract until the control rod 130 strikes limit switch LA—2.

When limit switch LA—2 closes, relay A—2 is energized to actuate the contacts in column A—2 whereby solenoid SA—2 is energized and relay D—2 is deenergized to deenergize solenoid D—2. Deenergization of solenoid SD—2 returns the flow control valve 65 to the position it occupies in Figure 9. Simultaneously therewith energization of solenoid SA—2 shifts the flow control valve 96 to cut off high pressure conduit 95 and interconnect low pressure conduit 99 with the conduit 21 of the hydraulic motor 2. Thus, high pressure fluid stands in conduit 95 and low pressure fluid is delivered to the hydraulic motor 2.

The hydraulic motor 2 will advance due to the delivery of low pressure fluid thereto to compact a fresh charge of granular plastic material which has been fed into the extrusion cylinder 11 when the extrusion plunger 13 was in its retracted position. Hydraulic motor 1 has continued its forward stroke to extrude plasticized material from the extrusion cylinder 10 but has not yet reached limit switch LB—1.

The apparatus is now in the condition wherein hydraulic motor 2 is compacting granular plastic material in extrusion cylinder 11 and hydraulic motor 1 is extruding plasticized material from extrusion cylinder 10, but the control rod 129 of hydraulic motor 1 has not yet reached limit switch LB—1. This is exactly the reverse position of the apparatus as shown in Figure 9. Therefore, after the control rod 129 of the hydraulic motor 1 strikes limit switch LB—1 the machine will go through the identical cycle which has just been described but in the reverse order as to the hydraulic motors 1 and 2.

Limit switch LB—1 will be engaged to energize relay B—1 and thereby actuate the contacts in column B—1 to deenergize relay A—2 and thereby deenergize solenoid SA—2 to cause control valve 96 to interconnect the conduits 95 and 21 for admitting high pressure fluid to the hydraulic motor 2. Solenoid SB—1 is energized simultaneously therewith to actuate the restriction valve 84 and thereby restrict the flow of high pressure fluid to the hydraulic motor 2 in the same manner as restriction valve 82 previously restricted the flow of high pressure to the hydraulic motor 1.

Admission of high pressure fluid to hydraulic motor 2 actuates the pressure actuated valve 120 to operate the hydraulic motor 107 and thus open the gate 55. Thus, hydraulic motor 1 is moving forward under the influence of high pressure fluid flow, while hydraulic motor 2 is moving forward under the influence of restricted high pressure flow in the manner previously described. This condition prevails until limit switch LC—1 is actuated by hydraulic motor 1, whereby the relay C—1 actuates the contacts in column C—1 to deenergize relay B—1 and thus deenergize solenoid SB—1. Deenergization of solenoid SB—1 throws an unrestricted flow of high pressure fluid upon hydraulic motor 2, high pressure fluid now standing upon hydraulic motor 1 even though it is at the end of its extrusion stroke. Energization of solenoid SC—1 by relay LC—1 opened an exhaust line for the hydraulic motor 105 through the valve 109 to permit the low pressure fluid standing in conduit 102 to close the gate 51 in extrusion cylinder 10.

When the gate 51 is closed limit switch LD—1 is actuated to energize relay D—1 which in turn actuates the contacts in column D—1 for deenergizing relay C—1 and thus solenoid SC—1 to close the exhaust conduit 110 of the hydraulic motor 105 and interconnect the conduit 110 with the conduit 108.

Energization of solenoid SD—1 by relay LD—1 moves the flow control valve 65 to close conduit 64b thereto and interconnects conduits 81 and 80 to exhaust fluid from the hydraulic motor 1. Hydraulic motor 2 continues its forward stroke under high pressure.

When hydraulic motor 1 reaches its retracted position limit switch LA—1 is engaged to energize solenoid SA—1 and deenergize solenoid SD—1, whereby the machine will again pass through the complete cycle of operation from its starting position (as shown in Figure 9) and follow through the same sequence of events in the electrical circuit from top to bottom (as shown in Figure 10).

*To stop machine*

When the operation of the machine is to be stopped it is desirable that the extrusion cylinders 10 and 11 shall be cleared of plastic material. Therefore, it is necessary that the extrusion plungers 12 and 13 shall both be moved to their extreme forward position. To accomplish this operation switch 133 (shown in Figure 10) is opened thereby deenergizing the complete control circuit. The pumps 60 and 70 however continue operation. When the control circuit is completely deenergized the flow control valves 65 and 96 will be in position (as shown in Figure 9) and control valve 88 will be shifted by the spring 127. Therefore, both hydraulic motors 1 and 2 will have high pressure fluid directed thereto for advancing the plungers 12 and 13. When the plungers have completed their stroke the switch 134 can be opened to stop the pumps 60 and 70.

To start machine

It must be remembered that when the machine was stopped both extrusion plungers 12 and 13 were moved into their extreme forward position. Therefore, both limit switches LC—1 and LC—2 will be closed. As soon as the main line switches 134 and 133 are closed to energize the pump circuit and the control circuit, solenoids SC—1 and SC—2 will both be energized to exhaust the hydraulic motors 105 and 107 since low pressure fluid is now standing in both conduits 102 and 106, solenoids SA—1 and SA—2 being deenergized because the circuit has not advanced sufficiently far to cause selective operation of one or the other of these solenoids. High pressure therefore stands on both hydraulic motors 1 and 2.

Energization of solenoids SC—1 and SC—2 permits operation of the hydraulic motors 105 and 107 to close the gates 51 and 55 respectively and thereby actuates both limit switches LD—1 and LD—2. Thus far the operation of the elements of both extrusion units has been simultaneous. It is now necessary to place one of the units in advance operation of the other.

When the limit switches LD—1 and LD—2 were closed both solenoids SD—1 and SD—2 were energized. Since these solenoids are in opposed relationship there would be no resultant operation of the fluid control valve 65. Therefore, solenoid SD—2 is larger than solenoid SD—1 to dominate in its operation. Therefore, solenoid SD—2 will cause the fluid flow control valve 65 to close conduit 64a and interconnect conduits 83 and 80 to exhaust the hydraulic motor 2.

The hydraulic motor 2 will be retracted by the low pressure fluid delivered through the conduit 20 until limit switch LA—2 is closed.

When limit switch LA—2 is closed solenoid SD—2 will be deenergized and solenoid SA—2 will be energized. Energization of solenoid SA—2 shifts the flow control valve 96 to interconnect conduit 99 with conduit 21 to supply low pressure fluid to the hydraulic motor 2, and thus advance the same to compact a charge of granular plastic material that has been fed into the extrusion cylinder 11 while the extrusion plunger 13 was in the retracted position. Therefore, the extrusion plunger 13 will move forward but will not reach limit switch LB—2.

As previously noted, solenoid SD—2 was deenergized at the time solenoid SA—2 was energized. It will also be remembered that limit switch LD—1 is still closed and thereby solenoid SD—1 is still energized. Therefore, when solenoid SD—2 was deenergized solenoid SD—1 will now shift the flow control valve 65 to close conduit 65b and interconnect conduits 81 and 80 to exhaust the hydraulic motor 1.

Hydraulic motor 1 will now be retracted by the admission of low pressure fluid through conduit 18 until limit switch LA—1 is closed. In the meantime hydraulic motor 2 stands under low pressure with the charge of plastic material compacted within the extrusion cylinder 11.

When limit switch LA—1 is closed solenoid SA—1 is energized and solenoid SD—1 is deenergized. Energization of solenoid SA—1 interconnects conduits 94 and 19 through flow control valve 88 to supply low pressure fluid to hydraulic motor 1 and advances the same to compact a charge of granular plastic material into the extrusion cylinder 10 that has been fed into the cylinder 10 while the extrusion plunger 12 was in the retracted position. Deenergization of solenoid SD—1 permits the control valve 65 to assume the position shown in Figure 9.

It will be remembered that under the present conditions solenoids SA—1 and SA—2 are both energized with low pressure fluid now standing in both hydraulic motors 1 and 2 and with a fresh charge of granular plastic material compacted in the extrusion cylinders 10 and 11. Also, the system now stands with high pressure fluid being directed to both fluid control valves 88 and 96, but with these valves in position so that high pressure fluid cannot enter the hydraulic motors 1 and 2. Therefore, it now becomes necessary to place one of the hydraulic motors 1 or 2 upon high pressure to cause extrusion of the material which has been heated and plasticized in the extrusion cylinder 11 during the period of compacting the granular plastic material.

To place one of the hydraulic motors on high pressure a normally closed control switch 135 is placed in series circuit with the relay A—1 through its holding circuit. Control switch 135 may now be actuated to open the circuit through relay A—1 and thus deenergize solenoid SA—1, whereby the flow control valve 88 will be shifted by the spring 127 to interconnect conduits 87 and 19 for admitting high pressure fluid to hydraulic motor 1. Hydraulic motor 1 will now advance under the influence of high pressure fluid and engage limit switch LB—1 and thereby automatically throw the machine into complete automatic synchronous operation.

While the apparatus disclosed and described herein shows a preferred form of the invention, it is to be understood that the specific disclosure can be modified without departing from the spirit of the invention and that all such modifications as fall within the scope of the appended claims are included herein.

Having thus fully described my invention what I claim as new and desire to secure by Letters Patent is:

1. The method of extrusion molding a continuous plastic section by means of a plurality of intermittently ejecting extrusion units which consists of placing one of the extrusion units on extrusion stroke by opening the extrusion chamber and applying a substantially constant volume of high pressure fluid from a first source of fluid on the extrusion member, of feeding plastic material within a closed extrusion chamber of another of the units, of compacting the charge of plastic material fed into the closed chamber of said other unit by applying low pressure fluid from a second source of fluid thereon while said first unit continues extrusion of plastic material, and of placing said other extrusion unit upon extrusion stroke when said first unit approaches completion of its extrusion stroke by opening said closed chamber and applying high pressure fluid from the first source on the extrusion member thereof whereby plastic material is fed through an extrusion nozzle in a constant continuous stream.

2. The method of extrusion molding a continuous plastic section by means of a plurality of intermittently ejecting extrusion units which consists of placing one of the extrusion units on extrusion stroke by opening the extrusion chamber and applying a substantially constant volume of high pressure fluid from a first source of fluid on the extrusion member, of feeding plastic material within a closed extrusion chamber of another of the units, of compacting the charge of plastic material fed into the closed chamber of said other unit by applying low pressure from a second source of fluid thereon while said first unit continues extrusion of plastic material, of placing said other unit upon extrusion stroke by opening said closed chamber and applying high pressure fluid from the first source on the extrusion member thereof while said first unit completes the last portion of its extrusion stroke, of closing the extrusion chamber of the first unit upon completion of the extrusion stroke thereof, and of retracting said first unit by the application of low pressure fluid from the second source on the extrusion member thereof to permit feeding a charge of plastic material into the same while said other unit continues its extrusion stroke, whereby plastic material is fed through an extrusion nozzle in a continuous stream.

3. The method of extrusion molding a continuous plastic strip by means of a plurality of intermittently ejecting extrusion units which consists of applying a high pressure constant delivery source of pressure fluid upon the extrusion member of an extrusion unit to place the same on extrusion stroke and opening the extrusion chamber of the unit whereby to force plastic material to an extrusion nozzle, of feeding plastic material into a closed extrusion chamber of another extrusion unit, of compacting the charge of plastic material in the other extrusion unit having the closed extrusion chamber under the influence of a second source of pressure lower than the first source while the first extrusion unit completes its extrusion stroke, of applying said first source of fluid pressure upon the extrusion member of said other extrusion unit concomitantly with the application of said first source on said first unit to place the other extrusion unit on extrusion stroke and opening the extrusion chamber thereof whereby to force plastic material therefrom to the extrusion nozzle before the first extrusion unit completes its extrusion stroke without increasing the total flow of plastic material through the nozzle, and of retracting the first extrusion unit upon completion of its extrusion stroke and closing its extrusion chamber concomitantly therewith while the other extrusion unit continues extrusion stroke to maintain a continuous constant flow of plastic material through the extrusion nozzle.

4. An apparatus for extrusion molding a continuous plastic strip which consists of a plurality of extrusion cylinders, plunger means for reciprocating within said cylinders to eject plastic material therefrom, means connecting said cylinders to a common extrusion nozzle, individual pressure operated motor means for reciprocating said plungers, means for applying low pressure fluid upon said motors for advancing said plungers through the initial portion of the forward stroke, means for applying high pressure fluid in substantially constant volume upon said motors for moving said plungers through the extrusion portion of the forward stroke, and means for selectively shifting said motors from low to high pressure at an intermediate and overlapping position of the forward stroke thereof to maintain continuous flow of plastic material through said extrusion nozzle.

5. An apparatus for extrusion molding a continuous plastic strip which consists of a plurality of extrusion cylinders, plunger means for reciprocating within said cylinders to eject plastic material therefrom, means connecting said cylinders to a common extrusion nozzle, means for supplying plastic material to said cylinders, fluid pressure operated motor means for reciprocating said plungers within said cylinders, means for supplying low pressure fluid to said motors for moving the same through a retraction stroke and to compact a charge of plastic material fed into the cylinders while said plungers are operated through the retraction stroke, means for supplying high pressure fluid to said motors for ejecting plastic material from the extrusion cylinders, and means for alternately shifting one of said motors from low pressure to high pressure operation in response to an intermediate position of another of said motors to maintain a continuous flow of plastic material through said extrusion nozzle.

6. An apparatus for extrusion molding a continuous plastic strip which consists of a plurality of extrusion cylinders, plunger means for reciprocating within said cylinders to eject plastic material therefrom, means connecting said cylinders to a common extrusion nozzle, means for feeding plastic material to said cylinders, gate means in said cylinders for closing the same when said plungers are operated through a retraction stroke and through the initial part of the forward stroke, means for supplying low pressure fluid to said motors for retracting the same and for advancing said motors to compact a charge of plastic material fed into said cylinders while said plungers were in retracted position, means for supplying high pressure fluid to said motors for advancing the same through the extrusion part of the forward stroke, means actuated by the application of high pressure on said motors for opening said gate means, and means for alternately shifting the application of low pressure and high pressure fluids on said motors to alternately operate said motors to maintain a continuous flow of plastic material through said extrusion nozzle.

7. An apparatus for extrusion molding a continuous plastic strip which consists of a plurality of extrusion cylinders, plunger means for reciprocating within said cylinders to eject plastic material therefrom, means connecting said cylinders to a common extrusion nozzle, means for feeding plastic material to said cylinders, gate means in said cylinders for closing the same, fluid pressure operated motor means for actuating said gate means, means for supplying low pressure fluid to said plunger actuating motors and said gate actuating motors to retract said plungers and close said gates, means to shift the flow of low pressure fluid to said plunger motors to advance the same to compact a charge of plastic material fed into said cylinders while said plungers were in the retracted position, means for supplying high pressure fluid to said plunger motors and said gate motors, means responsive to an intermediate forward position of said plungers for applying said high pressure upon said plunger motors and said gate motors for opening said gates and advancing said plungers through an extrusion stroke, and means regulating the flow of said low pressure and high pressure fluids to alternately operate said motors to maintain a continuous flow of plastic material through said extrusion nozzle.

8. An apparatus for extrusion molding a continuous plastic strip comprising a pair of intermittently operated plastic ejection units connected to a single extrusion nozzle which receives plastic material from either unit, independent fluid pressure motors for actuating said units, means for supplying high pressure fluid to said motors, means for controlling the flow of high pressure fluid to said motors alternately, independent means in series flow relationship with said last mentioned means for preventing flow of high pressure fluid to each of said motors, means actuated by one of said motors when it approaches the end of its ejecting stroke to actuate one of said last mentioned means whereby said actuated last mentioned means directs high pressure fluid to a second motor associated therewith, means actuated by said one motor upon completion of its ejecting stroke for actuating said high pressure flow control means to cut off the supply of high pressure fluid to said one motor, and means for instantly supplying low pressure fluid to said one motor to retract the same to permit the ejection cylinder associated therewith to receive a charge of plastic material.

9. An apparatus for extrusion molding a continuous plastic strip comprising a pair of intermittently operated plastic ejection units connected to a single extrusion nozzle which receives plastic material from either unit, independent fluid pressure motors for actuating said units means for supplying high pressure fluid to said motors, means for controlling the flow of high pressure fluid to said motors alternately, independent means in series flow relationship with said last mentioned means for preventing flow of high pressure fluid to each of said motors, means actuated by one of said motors when it approaches the end of its ejecting stroke to actuate one of said last mentioned means whereby said actuated last mentioned means directs high pressure fluid to a second motor associated therewith, means actuated concomitantly with said last mentioned means for restricting the flow of high pressure fluid to said second motor, means actuated by said one motor upon completion of its ejecting stroke for actuating said high pressure flow control means to cut off the supply of high pressure fluid to said one motor and concomitantly actuate said restricting means to release the restriction to said second motor, and means for instantly supplying low fluid pressure to said one motor to retract the same to permit the ejection cylinder associated therewith to receive a charge of plastic material.

10. An apparatus for extrusion molding a continuous plastic strip comprising a pair of intermittently operated plastic ejection units connected to a single extrusion nozzle which receives plastic material from either of the units, independent hydraulic motors for actuating said units, a low pressure fluid system for said motors, a high pressure fluid system for said motors, flow control valve means for controlling the application of low pressure or high pressure fluid to said motors, restriction valve means disposed in the high pressure fluid flow circuit to said motors, and an electrical control system for actuating said flow control valve means to alternately apply low pressure and high pressure upon said hydraulic motors during a forward stroke of said motors in response to predetermined positions of said hydraulic motors, said control system including means for actuating said restriction valve means to release restriction therethrough in response to the forwardmost position of said hydraulic motors.

11. An apparatus for continuous extrusion molding including, a plurality of plastic ejection units for intermittent injection of plastic material therefrom connected to a single extrusion nozzle which receives plastic material from any of the units, independent double-acting hydraulic motors for actuating said units, a source of low fluid pressure, a source of high fluid pressure, means connecting said low pressure source continuously to the retraction side of said motors, valve means controlling the flow of low fluid pressure and high fluid pressure alternately to the advancing side of each of said motors, valve means controlling flow of high pressure fluid to said motors through said first mentioned valve means, means actuated by an intermediate forward position of one of said motors to actuate said first mentioned valve means to shift the flow of pressure fluid to a second of said motors from low pressure to high pressure, and means actuated by the forwardmost position of said one motor to actuate said second mentioned valve means to stop the flow of high pressure fluid to said one motor whereby the low pressure fluid standing on the retraction side of said one motor instantly retracts the same.

12. An apparatus for continuous extrusion molding including, a plurality of plastic ejection units for intermittent injection of plastic material therefrom connected to a single extrusion nozzle which receives plastic material from any of the units, independent double-acting hydraulic motors for actuating said units, a source of low fluid pressure, a source of high fluid pressure, means connecting said low pressure source continuously to the retraction side of said motors, valve means controlling the flow of low fluid pressure and high fluid pressure alternately to the advancing side of each of said motors, valve means controlling flow of high pressure fluid to said motors through said first mentioned valve means, means actuated by an intermediate forward position of one of said motors to actuate said first mentioned valve means to shift the flow of pressure fluid to a second of said motors from low pressure to high pressure, means actuated by the forwardmost position of said one motor to actuate said second mentioned valve means to stop the flow of high pressure fluid to said one motor whereby the low pressure fluid standing on the retraction side of said one motor instantly retracts the same, and means actuated by the full retraction position of said one motor for actuating said first mentioned valve means to shift the same for the application of low pressure upon the advancing side of said one motor.

13. An apparatus for continuous extrusion molding including, a plurality of plastic ejection units for intermittent injection of plastic material therefrom connected to a single extrusion nozzle which receives plastic material from any of the units, independent double-acting hydraulic motors for actuating said units, a source of low fluid pressure, a source of high fluid pressure, means connecting said low pressure source continuously to the retraction side of said motors, valve means controlling the flow of low fluid pressure and high fluid pressure alternately to the advancing side of each of said motors, valve means controlling flow of high pressure fluid to said motors through said first mentioned valve means, restriction valve means for independently supplying high pressure fluid to each of said motors, means actuated by an intermediate forward position of one of said motors to actuate said first mentioned valve means and apply high pressure fluid upon a second of said motors, and concomitantly actuate the restriction valve means associated therewith to restrict the flow of high pressure fluid to said second motor, means actuated by the forwardmost position of said one motor for actuating said second mentioned valve means to stop the flow of high pressure fluid to said one motor whereby the low pressure fluid standing on the retraction side of said one motor instantly retracts the same and for concomitantly actuating said restriction valve means to release the restriction to the flow of high pressure fluid to said second motor.

14. An apparatus for continuous extrusion molding including, a plurality of plastic ejection units for intermittent injection of plastic material therefrom connected to a single extrusion nozzle which receives plastic material from any of the units, independent double-acting hydraulic motors for actuating said units, a source of low fluid pressure, a source of high fluid pressure, means connecting said low pressure source continuously to the retraction side of said motors, valve means controlling the flow of low fluid pressure and high fluid pressure alternately to the advancing side of each of said motors, valve means controlling flow of high pressure fluid to said motors through said first mentioned valve means, restriction valve means for independently supplying high pressure fluid to each of said motors, gate means for said extrusion units to independently control the flow of plastic material therefrom, means for actuating said gate means, means actuated by an intermediate forward position of one of said motors to actuate said first mentioned valve means to shift the flow of fluid pressure to a second motor from low pressure to high pressure and simultaneously open the gate means associated therewith and actuate the resistance valve means associated with said second motor to resist the flow of high pressure fluid to said second motor, means actuated by the forwardmost position of said one motor for closing the gate means associated therewith and concomitantly actuating said resistance valve means associated with said second motor to release the restriction therethrough to permit full flow of high pressure fluid to said second motor, means actuated by the closed position of said last mentioned gate means for actuating said second mentioned valve means to stop the flow of high pressure fluid to said one motor whereby the low pressure fluid standing on the retraction side of said one motor instantly retracts the same, and means actuated by the full retraction position of said one motor for shifting said first mentioned valve means to conduct low pressure fluid to the advancing side of said one motor.

HOWARD F. MACMILLIN.